US005266140A

United States Patent [19]

Kohno

[11] Patent Number: 5,266,140

[45] Date of Patent: Nov. 30, 1993

[54] METHOD OF MAKING A SUPPORT SHEET-CONTAINING PLASTIC FILM POCKET

[75] Inventor: Yoshiharu Kohno, Ikeda, Japan

[73] Assignee: Kohno Fasei Co., Ltd., Japan

[21] Appl. No.: 964,280

[22] Filed: Oct. 21, 1992

[30] Foreign Application Priority Data

Jan. 14, 1992 [JP] Japan .................................. 4-024522

[51] Int. Cl.[5] ......................... B29C 53/08; B32B 31/18

[52] U.S. Cl. ................................ 156/227; 156/244.14; 156/244.18; 156/259; 156/270; 156/290; 53/455; 53/459

[58] Field of Search ................. 53/455, 457, 459, 468, 53/469, 473, 562; 156/226, 227, 259, 269, 270, 244.14, 244.18, 290, 301; 270/57

[56] References Cited

U.S. PATENT DOCUMENTS 3,254,828 6/1966 Lerner .................................. 53/459

FOREIGN PATENT DOCUMENTS 1167002 4/1964 Fed. Rep. of Germany .

1272208 7/1968 Fed. Rep. of Germany .

*Primary Examiner*—Michael W. Ball

*Assistant Examiner*—Richard Crispino

*Attorney, Agent, or Firm*—Barnes, Kisselle, Raisch, Choate, Whittemore & Hulbert

[57] ABSTRACT

A method of making a support sheet-containing plastic film pocket for use in files. A continuous thin-film tubular material formed continuously by synthetic resin inflation molding is folded at opposite sides thereof into a flat tubular sheet consisting of an upper thin-film sheet and a lower thin-film sheet. The upper thin-film sheet is cut centrally along the length thereof. Two halves of the cut upper thin-film sheet are opened, and support sheets are inserted between respective opened halves of the upper thin-film sheet and corresponding portions of the lower thin-film sheet. Cut edge portions of the upper thin-film sheet are tacked to the lower thin-film sheet. Then, the thin-film tubular material, with support sheets inserted therein, is cut to a predetermined size of a target plastic film pocket. One end resulting from this cutting is welded. Again, the cut edge portions of the upper thin-film sheet or portions adjacent thereto are welded to at least the lower thin-film sheet.

2 Claims, 5 Drawing Sheets

METHOD OF MAKING A SUPPORT SHEET-CONTAINING PLASTIC FILM POCKET

FIELD OF THE INVENTION

This invention relates to a method of making a support sheet-containing plastic film pocket for use for document filing purposes.

BACKGROUND OF THE INVENTION

Files of the type having a large number of light-pervious plastic film-made pockets bound together are known. Such plastic film pockets are generally made available as synthetic resin-made pockets having good transparency in order that they may be effectively used for storing and preserving various reference materials, documents and valuable collections. A support sheet is inserted in such a plastic film pocket for purposes of shape retention and otherwise.

A method of making such plastic film pockets is known such that, for example, a synthetic resin, such as a polyethylene resin, is continuously molded by inflation molding into continuous thin-film tubular material having relatively high transparency, which in turn is heat sealed at portions to be used as lower ends of pockets and is cut at each such portion. Cutting is made to a desired size for plastic film pockets so as to define a portion which serves as the upper end of each pocket.

The insertion of support sheets into plastic film pockets is effected in such a manner that after the upper end of each pocket is opened, two support sheets are inserted through the opening into the pocket to assume laterally spaced positions therein. Files are fabricated by placing a plurality of support sheet-containing plastic film pockets obtained in manner as above noted in superposed relation on a sheet material which serves as an outer cover sheet, and welding them together at central portions thereof in which no support-sheet is present.

According to such known method of making plastic film pockets, however, it is necessary that support sheets must be inserted into each pocket which is already made in the form of a pouch. This involves a difficulty in that it is impracticable to mechanize the step of support sheet insertion or carry out the step without manual operation. Indeed, considerable labor is required for proper insertion of two support sheets into position.

As such, the supply of support sheet-containing plastic film pockets does not catch up with growing demand for files using such film pockets, and this has been the largest factor for low productivity in the manufacture of files.

DISCLOSURE OF THE INVENTION

It is a primary object of the invention to provide a method of making a support sheet-containing plastic film pocket which eliminates the above noted problem involved in the process of support sheet insertion into a plastic film pocket, and which affords ease of support sheet insertion, is suitable for use in mechanized operation and provides for higher productivity.

In order to accomplish this objective, the invention comprises the steps of: flattening a continuous thin-film tubular material continuously formed by synthetic resin inflation molding, at opposite sides thereof into a flat tubular sheet consisting of an upper thin-film sheet and a lower thin-film sheet; cutting the upper thin-film sheet centrally along the length thereof; opening two halves of the torn upper thin-film sheet and inserting support sheets between the respective opened halves of the upper thin-film sheet and the corresponding portions of the lower thin-film sheet; then tacking the cut edge portions of the upper thin-film sheet down to the lower thin-film sheet; cutting the thin-film tubular material, with the support sheets inserted therein, to a predetermined size for a plastic film pocket, and welding the resulting one cut-end of the thin-film tubular material; and subsequently welding the cut edge portions or portions adjacent thereto of the upper thin-film sheet to at least the lower thin-film sheet.

In this way, according to the invention, the upper thin-film sheet of the continuous thin-film tubular material is first torn centrally along the length thereof, and then support sheets are inserted between the respective opened halves of the upper thin-film sheet and the corresponding portions of the lower thin-film sheet. This permits easy insertion of the support sheets and provides for mechanization of the process of support-sheet insertion. Thus, higher productivity can be achieved in the manufacture of support sheet-containing plastic film pockets.

DESCRIPTION OF THE EMBODIMENTS

Figure 1:
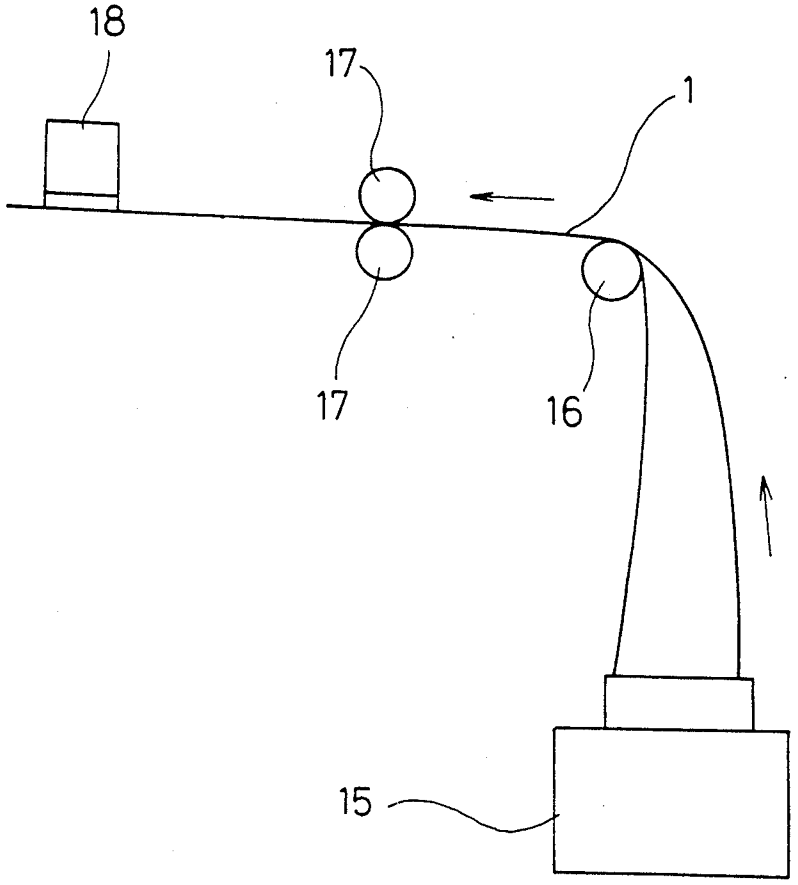
FIG. 1 is a schematic diagram showing by way of example a method of manufacturing a thin-film tubular material.
Figure 2:
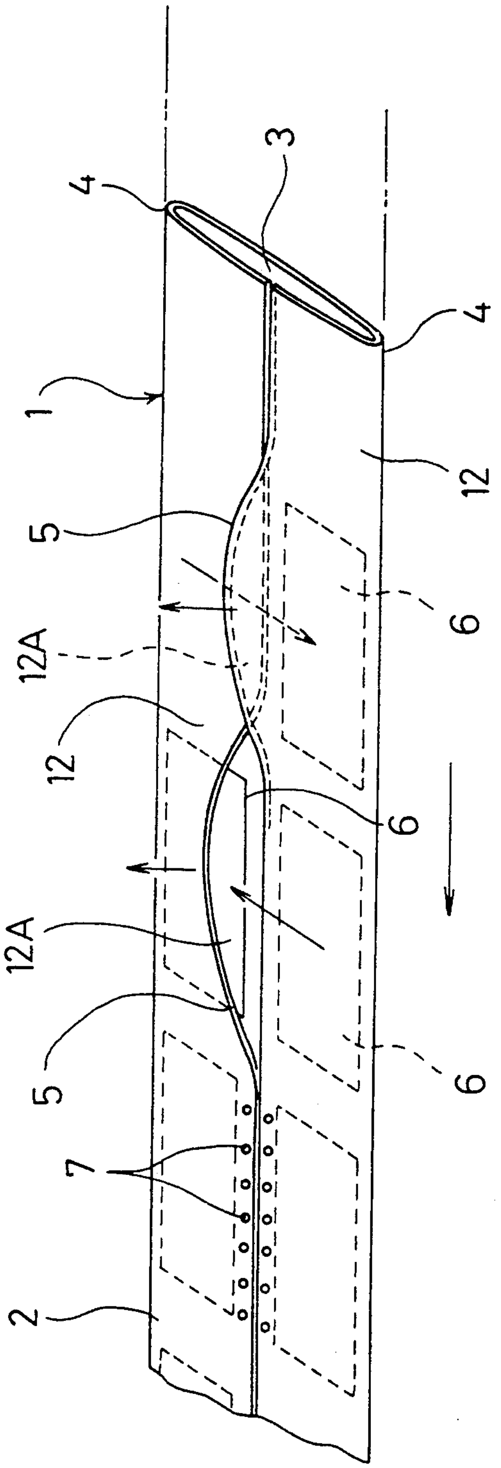
FIG. 2 is a perspective view showing by way of example a thin-film tubular material whose upper thin-film sheet is cut centrally along the length thereof, with support sheets shown as being inserted into the tubular material and cut edge portions of the upper thin-film sheet as tacked in position.

In FIGS. 1 and 2, reference numeral 1 designates a continuous thin-film tubular material continuously formed by synthetic resin inflation molding. Synthetic resins useful for purposes of inflation molding are those having a comparatively high degree of transparency and, in addition, good moldability and high mechanical strength. For example, polyolefin resins, such as polyethylene and polypropylene, can be advantageously used.

In FIG. 1, an inflation molding machine 15 has an extrusion port from which molten synthetic resin is extruded in a tube form. The extruded tubular material is inflated by the pressure of air blown thereinto, being thus formed into a continuous thin-film tubular material 1 having uniform thickness.

The continuous thin-film tubular material 1 is passed through a guide roll 16 and then folded flat by presser rolls 17, 17. As a consequence, as shown in FIG. 2, the tubular material 1, folded at opposite sides 4, 4, is formed into a flat tubular sheet consisting of an upper thin-film sheet 2 and a lower thin-film sheet 3. Then, the upper thin-film sheet 2 is cut centrally along the length thereof by a cutter 18.

Then, one of halves 12, 12 of the upper thin-film sheet 2 is displaced away from the lower thin-film sheet 3 through the utilization of vacuum suction cups or the like, the one half 12 being thus opened at a cut edge portion 5 thereof, as shown in FIG. 2. Through an opening 12A thus formed is inserted with a support sheet 6 of a predetermined size between the one half 12 and the corresponding portion of the lower thin-film sheet 3, from the cut edge portion 5 toward side 4. Likewise, an opening 12A is formed with respect to the other half 12 and a support sheet 6 is inserted into position through the opening. In this way, openings 12A, 12A are formed in alternate intervals for insertion of support sheets in position therethrough, whereby interference of an inserting operation with another can be effectively prevented.

Then, the cut edge portions 5, 5 are tacked to the lower thin-film sheet 3 by spot welding at a plurality of locations as shown by reference numeral 7. By virtue of such tacking, supprt sheets 6, 6 are prevented from possible displacement.

Figure 3:
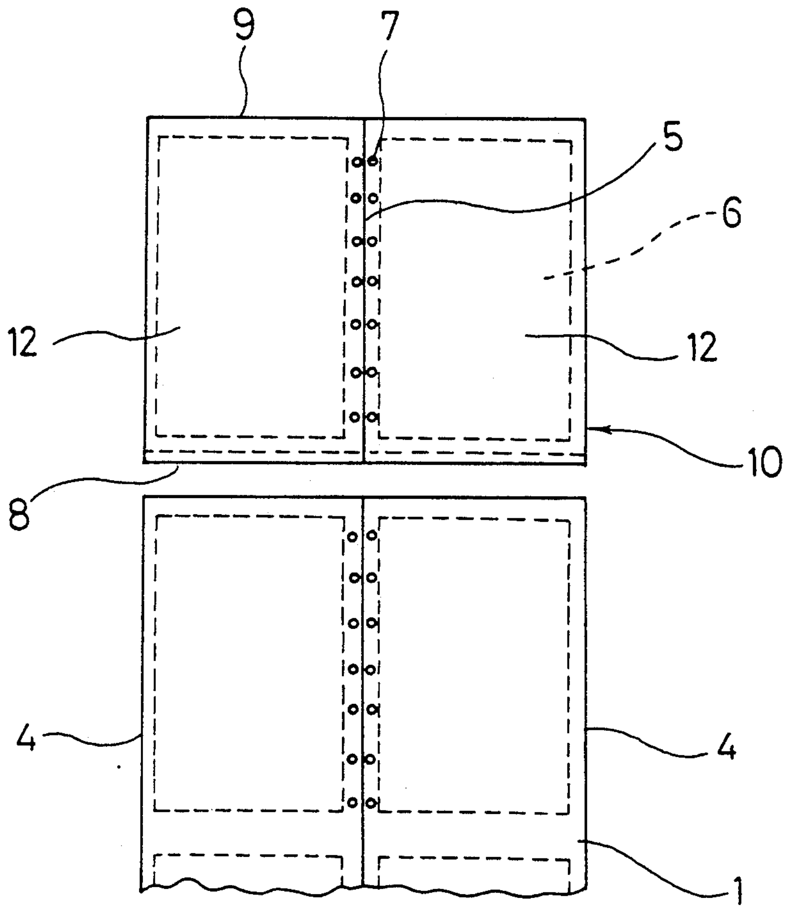
FIG. 3 is a view showing the thin-film tubular material of FIG. 2 as cut to a size suitable for use as a plastic film pocket.

Then, the thin-film tubular material 1, with support sheets 6, 6 inserted between respective halves 12, 12 and the corresponding portions of the lower thin-film sheet 3, is severed and the separated end 8 thereof is welded, as shown in FIG. 3. The end 8 thus sealed by welding constitutes the lower edge of a plastic film pocket 10. An end 9 which constitutes the upper edge of the pocket 10 is formed by cutting the thin-film tubular material 1 to a predetermined size for the pocket. The end 9 as the upper edge of the pocket is not welded and remains open.

Severance at end 8 may be done by a so-called fusion method in which both cutting and welding can be effected simultaneously.

Also, it is possible to perform end 9 cutting and end 8 fusing simultaneously. Again, it is possible to carry out end 9 cutting and end 8 fusing at different times, for example, end 8 fusing after end 9 cutting.

Figure 4:
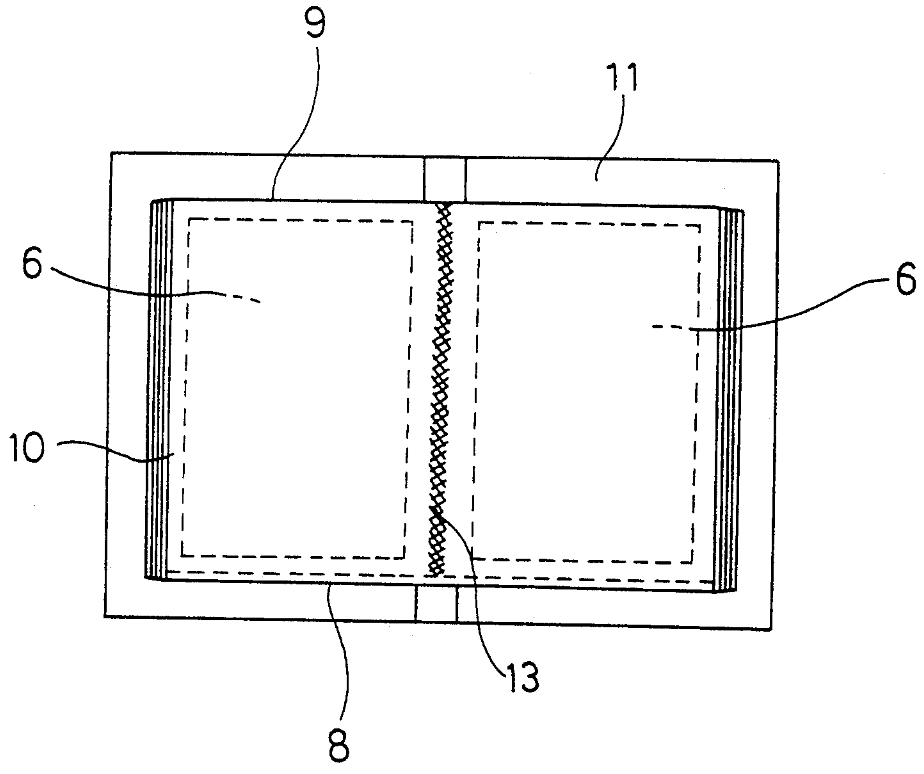
FIG. 4 is a view showing a plurality of support sheet-containing plastic film pockets stacked together on an outer cover sheet, with cut edge portions of upper thin-film sheets as sealed by welding.

Then, as FIG. 4 shows, a plurality of pockets 10 are stacked on an outer cover sheet 11, and the pockets 10 are welded at torn edge portions 5, 5 of upper thin-film sheets 2 onto the outer cover sheet 11. Thus, the cut edge portions 5, 5 remaining open except at tack spots 7 are simultaneously sealed.

Suitable for use as the outer cover sheet 11 is a material having high rigidity and good weldability relative to plastic film pockets 10, such for example as polypropylene. Ultrasonic welding is suitable for purposes of welding pockets 10 onto the outer cover sheet 11. Application of the ultrasonic welding technique can result in formation of a welded portion 13 with good effect comparable to that of riveting and without involving welding of any peripheral portion. The outer cover sheet 11 is folded at a weld 13 between it and the pockets 10 which defines a center line of the outer cover sheet 11, so that a desired file can be obtained.

In the foregoing embodiment, a plurality of pockets 10 are stacked on an outer cover sheet 11 of a file assembly and thereafter welding is effected at torn edge portions of upper thin-film sheets 2. Alternatively, welding may be effected with pockets 10 without their being stacked on an outer cover sheet 11, or may be effected with each individual pocket 10.

When welding is carried out for each single pocket 10 at torn edge portions 5, 5 of the upper thin-film sheet 2, and not with pockets stacked on an outer cover sheet 11 for a file, a thin-film tubular material 1 consisting of two halves or a pair of pockets can be cut along a center line thereof. Thus, two half-size plastic film pockets 20, each containing a support sheet 6, can be obtained as shown in FIG. 5.

Figure 5:
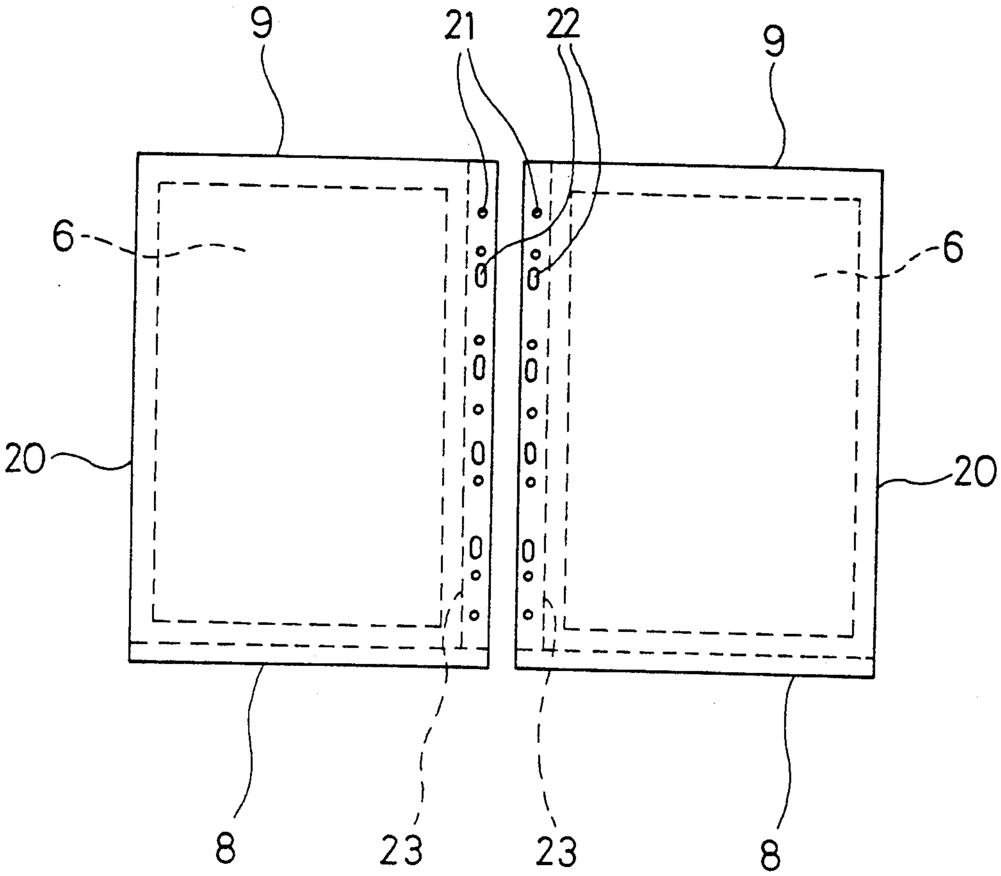
FIG. 5 is a view showing plastic film pockets each having only one support sheet inserted therein.

The pockets 20 shown in FIG. 5 are each formed at one side with pluralities of holes 21, 22 of different shape which are provided for engagement with engaging members provided in a file for the purpose of filing the pockets 20. The provision of holes 21 and holes 22 different in shape is intended to adapt the pockets 20 for filing in a variety of files having different types of engaging members. Use of more different types of holes is possible.

In the pockets 20 shown in FIG. 5, each pocket is welded at a portion located inward from holes 21, 22 in order to prevent the support sheet 6 from shifting excessively toward the holes 21, 22. Shown at 23 is a welded portion.

According to the invention, continuous thin-film tubular material 1 is continuously formed by inflation molding, which fact permits high-speed mass production.

According to the invention, upper thin-film sheet 2 is cut centrally along the length thereof by cutter 18; two halves 12, 12 of the upper thin-film sheet 2 are opened at cut edge portions 5, 5 of the thin-film sheet 2; and support sheets 6, 6 are inserted between respective halves 12, 12 and corresponding portions of the lower thin-film sheet 3. Therefore, the insertion of support sheets 6, 6 can be easily effected and can be suitably mechanized.

Cut edge portions 5, 5 are each tacked at a plurality of locations by spot welding, and tacked portions 7 thereof prevent support sheets 6, 6 from slipping out of position. Again, this prevents off-position slipping of support sheets 6, 6 during the transport of each tubular material 1 to a next stage of operation where cutting at ends 8, 9 and welding at end 8 are carried out.

As described above, according to the invention, the upper thin-film sheet of continuous thin-film tubular material is cut centrally along the length thereof, and support sheets are inserted between respective halves of the upper thin-film sheet and corresponding portions of the lower thin-film sheet. This provides for ease of support-sheet insertion and facilitates mechanization of support-sheet inserting operation, thus resulting in improved productivity.

What is claimed is:

1. A method of making a support sheet-containing plastic film pocket for use in files, comprising the steps of:

flattening a continuous thin-film tubular material continuously formed by synthetic resin inflation molding, and thus forming a flat tubular sheet consisting of an upper thin-film sheet and a lower thin-film sheet;

cutting the upper thin-film sheet centrally along the length thereof so that said upper thin-film sheet may be divided into two halves such that one of said two halves is transversely disposed on one side of a longitudinal center line of said flat tubular sheet and the other of said two halves is transversely disposed on the other side of said longitudinal center line;

alternately lifting said one of said two halves and said other of said two halves and alternately inserting support sheets between the respective opened halves of the upper thin-film sheet and the corresponding portions of the lower thin-film sheet;

then tacking the cut edge portions of the upper thin-film sheet down to the lower thin-film sheet so as to form a strip containing a plurality of said support sheets spaced from each other and longitudinally arranged in two rows;

sequentially cutting the thin-film tubular material in a transverse direction at positions intermediate adjacent pairs of said support sheets;

sealing one of two transverse cut ends formed at each of said positions; and subsequently welding the cut edge portions or portions adjacent thereto of the upper thin-film sheet to at least the lower thin-film sheet.

2. A method of making a plastic film pocket as set forth in claim 1, wherein the cut edge portions of the upper thin-film sheet or portions adjacent thereto are welded to at least the lower thin-film sheet and, the thin-film tubular material is cut along a center line thereof.

* * * * *